(12) United States Patent
Tubic et al.

(10) Patent No.: US 12,396,594 B2
(45) Date of Patent: Aug. 26, 2025

(54) CONTINUOUS FRYING DEVICE (71) Applicant: MAREL FURTHER PROCESSING B.V., Boxmeer (NL)

(72) Inventors: Tihomir Tubic, Boxmeer (NL); Johannes Martinus Meulendijks, Boxmeer (NL); Albertus Dunnewind, Boxmeer (NL)

(73) Assignee: MAREL FURTHER PROCESSING B.V, Boxmeer (NL)

( * ) Notice: Subject to any disclaimer, the term of this patent is extended or adjusted under 35 U.S.C. 154(b) by 0 days.

(21) Appl. No.: 18/853,940

(22) PCT Filed: Apr. 19, 2023

(86) PCT No.: PCT/EP2023/060126
§ 371 (c)(1),
(2) Date: Oct. 3, 2024

(87) PCT Pub. No.: WO2023/203074
PCT Pub. Date: Oct. 26, 2023

(65) Prior Publication Data
US 2025/0107663 A1 Apr. 3, 2025

(30) Foreign Application Priority Data
Apr. 22, 2022 (NL) .................................. 2031667

(51) Int. Cl.
*A47J 37/12* (2006.01)
*A23L 5/10* (2016.01)
(Continued)

(52) U.S. Cl.
CPC ............. *A47J 37/1223* (2013.01); *A23L 5/11* (2016.08); *A47J 37/1266* (2013.01); *B01D 33/333* (2013.01); *B01D 33/466* (2013.01)

(58) Field of Classification Search
CPC .. B01D 33/466; B01D 33/333; A47J 37/1266; A47J 37/1223; A23L 5/11
(Continued)

(56) References Cited

U.S. PATENT DOCUMENTS 3,380,375 A * 4/1968 Benson ............... A47J 37/1214
99/404
3,616,909 A 11/1971 Lowrey et al.
(Continued)

FOREIGN PATENT DOCUMENTS

NL        1034711 C2      5/2009
WO     2020193615 A1    10/2020
WO   WO-2011102422 A1 *  8/2021 .......... A47J 37/1223

OTHER PUBLICATIONS

Dutch Search Report from corresponding Dutch Patent Application No. NL2031667, Nov. 25, 2022.
(Continued)

*Primary Examiner* — Jimmy Chou
(74) *Attorney, Agent, or Firm* — Workman Nydegger (57) ABSTRACT

A continuous frying device is for carrying out a frying process for food products. The device includes a frying oil reservoir which can be filled with a volume of frying oil; a food product carrier which can at least partially be immersed in the frying oil in the frying oil reservoir and at least one heating unit having at least one heating element which is positioned at least partially inside the frying oil reservoir and which has a heating surface which is in contact with the frying oil in the frying oil reservoir during the frying process. The filter chain has a first filter inside the frying oil reservoir and an external filter chain. In operation a volume of at least three times the volume of frying oil contained in the frying oil reservoir passes through the external filter chain per hour.

15 Claims, 5 Drawing Sheets

(51) Int. Cl.
*B01D 33/333* (2006.01)
*B01D 33/46* (2006.01)

(58) Field of Classification Search
USPC .......................................................... 99/330
See application file for complete search history.

(56) References Cited

U.S. PATENT DOCUMENTS

| | | | | |
|---|---|---|---|---|
| 4,081,375 A * | 3/1978 | Deal | ................... | B01D 33/466 210/DIG. 8 |
| 4,204,464 A * | 5/1980 | Strobel | ................. | A23L 27/115 426/594 |
| 5,142,968 A * | 9/1992 | Caron | ...................... | F25B 5/04 99/407 |
| 5,182,982 A * | 2/1993 | Hattori | ................ | A47J 37/1214 99/511 |
| 5,223,137 A * | 6/1993 | Hattori | ................... | B04B 11/08 210/368 |
| 5,403,260 A * | 4/1995 | Hensley | ................ | B04B 1/2016 494/53 |
| 5,454,296 A * | 10/1995 | Beardsley | ............... | A47J 36/38 126/300 |
| 5,988,051 A * | 11/1999 | Hashiguchi | .............. | A23B 2/10 99/410 |
| 6,202,543 B1 * | 3/2001 | Moya | ..................... | B01D 29/27 210/DIG. 8 |
| 6,254,790 B1 * | 7/2001 | King | ................... | A47J 37/1223 210/767 |
| 7,018,326 B2 * | 3/2006 | Koch | ....................... | B04B 1/20 494/53 |
| 7,387,602 B1 * | 6/2008 | Kirsch | ................... | B04B 11/02 494/53 |
| 7,566,468 B1 * | 7/2009 | Oberlin | .................. | C11B 3/008 426/422 |
| 7,681,655 B2 * | 3/2010 | Biehl | ...................... | A47J 27/09 169/65 |
| 2001/0029846 A1 * | 10/2001 | Nothum, Sr. | ....... | A47J 37/1214 99/407 |
| 2002/0006460 A1 * | 1/2002 | Hwang | ................ | B01D 21/262 210/100 |
| 2002/0174776 A1 * | 11/2002 | Nockermann | ...... | A47J 37/1233 99/330 |
| 2003/0183092 A1 * | 10/2003 | Barber | ................... | A23L 19/18 99/536 |
| 2004/0007137 A1 * | 1/2004 | Hwang | ............... | A47J 37/1223 99/330 |
| 2004/0060456 A1 * | 4/2004 | Chung | ................ | A47J 37/1219 99/403 |
| 2005/0011370 A1 * | 1/2005 | Xu | ......................... | A47J 36/165 99/409 |
| 2007/0163450 A1 * | 7/2007 | Zaghloul | ............. | A47J 37/1271 99/495 |
| 2009/0304878 A1 * | 12/2009 | Loehn | ....................... | A23L 5/11 426/241 |
| 2010/0247726 A1 * | 9/2010 | van der Eerden | .. | A47J 37/1214 426/438 |
| 2019/0335950 A1 * | 11/2019 | Savage | ................ | A47J 37/1242 |
| 2020/0345179 A1 * | 11/2020 | Barandun | ............. | G01K 13/00 |
| 2023/0097915 A1 * | 3/2023 | Wixson | .................. | B01D 29/15 426/417 |

OTHER PUBLICATIONS

International Search Report from corresponding PCT Application No. PCT/EP2023/060126, Jul. 17, 2023.

* cited by examiner

CONTINUOUS FRYING DEVICE

FIELD OF THE INVENTION

The present invention relates to a frying device for carrying out a frying process for food products. The device comprises a frying oil reservoir which, in use, is filled with a volume of frying oil, a food product carrier which is at least partially immersible in the frying oil in the frying oil reservoir, and at least one heating unit for heating the frying oil in the frying oil reservoir during the frying process. The device also comprises an oil circulation pump for circulating the frying oil from a supply side of the frying oil reservoir to an opposite distal suction end of the frying oil reservoir and a first filter at the suction end in the frying oil reservoir for filtering particles from the circulating frying oil. The oil circulation pump comprises a suction box downstream behind the first filter and is configured to, in operation, pump the frying oil from the frying oil reservoir downstream the first filter, through an external filter chain, back into the frying oil reservoir at the supply side of the frying oil reservoir.

In particular, the invention relates to a frying device which is designed to be used in an industrial-scale food-processing system.

BACKGROUND OF THE INVENTION

An oil frying device as outlined above is known from US2001/029846 which discloses a frying device for deep-frying or frying large amounts of food products in a continuous process on an industrial scale. The frying device has a frame which extends in the axial direction from a feed position to a discharge position for food products. An elongate horizontal tray containing a volume of frying oil, also referred to as "deep-frying channel" or "frying channel", is fixedly connected to the frame. The frying channel is to be filled with a volume of frying oil which is also known as fat, deep-frying fat, frying oil, etc. The food products to be fried, such as potato products, combination products containing for example cheese or vegetables, meat or fish products, are conveyed through the frying channel while being retained, e.g. clamped, between two conveyors of the frying device. The upper conveyor, e.g. serves to keep the products submerged in the frying oil. In particular when frying coated products, for instance tempura coated products such as chicken nuggets and battered or breaded food products such as fried chicken or fish, the applied coating is still fragile when entering the fryer. At the moment the food products enter the hot bath they will be subjected to mechanical and/or fluid-dynamical impact and the coating can be damaged or can even be removed from the food product resulting in separated particles such as bread crumbs, tempura, food particles, fines and other solid particles entering the hot fluid-bath. In order to maintain the quality of the frying process the particles in the frying oil need to be extracted from the frying oil.

Another frying device is known from NL1034711A and comprises a frying oil reservoir which can be filled with a volume of frying oil; a food product carrier which can at least partially be immersed in the frying oil in the frying oil reservoir and at least one heating unit having at least one heating element which is positioned at least partially inside the frying oil reservoir and which has a heating surface which is in contact with the frying oil in the frying oil reservoir during the frying process.

Known industrial deep-frying device comprises a plurality of filters and other means for extracting particles from the frying oil. In order to increase the probability of catching particles within the frying oil the known industrial deep-frying devices apply a series of fine meshed filters, both inside the frying oil reservoir and external thereof. In known meshed filters, the filters have a very fine mesh size such that even very small particles in the oil, sometimes up to a size of 15 microns, can be extracted from the frying oil. The finer the mesh size the higher the flow resistance of such oil filter becomes.

The structural design of these filters vary from a woven mesh filter or fine-meshed sieve, or batchwise filters such as described in U.S. Pat. No. 7,566,468 (Oberlin) wherein a batch of particle polluted cooking oil is collected onto a filter cloth to build up a filter cake of particles which is subsequently pressurized in order to dry the filter cake of particles and disposed of in a batchwise fashion. Other filter means include a decanter filter such as described in US patent US 2002/006460 A1 (Stein). The oil treatment apparatus transports a batch of oil to be treated from a source through a first conduit to a treatment station. The treatment station includes a filter system capable of extracting particulate material from the oil and removing the particulate material from the filter system as it is removed from the oil. A batchwise filtering of frying oil incorporates a certain amount of processing time of the oil inside the filter unit, which leads to a loss of thermal energy contained in the frying oil.

When processing food products, such as fried chicken, fried fish or meat, fried potato products and the like, food particles, such as bread crumbs, fat residues, pieces of meat and grains come off the food product to be deep-fried and contaminate the frying oil. These frying oil contaminants cause an accelerated degradation of the frying oil.

Stopping the fryer to remove and filter the oil is not practical due to loss of production capacity. Therefore, the oil circulation pump circulates the oil through the frying oil reservoir and through a series of filters to keep free-fatty-acid (FFA) levels less than 1% and to keep the colour of the oil from becoming too dark.

Typically, filters are used in order to filter the oil in the frying oil reservoir. The oil circulation pump used to pump the oil through the frying oil reservoir, pumps the oil from the reservoir, through a series of filters and brings the cleaned oil back into the frying oil reservoir. In order to catch enough contaminants, typical frying devices of this type introduce increasingly smaller mesh sizes for the sequence of filters to increase the probability to catch the contaminants. It is a disadvantage of this type of filtering that the very fine mesh sizes also introduce an increasing flow resistance to the circulating oil to be filtered, which results in a reduced amount of oil passing through the frying oil filters, typically circulating the volume of frying oil in the frying oil reservoir only once every couple of hours, and as a result reducing the probability of catching a contaminant from the frying oil reservoir.

SUMMARY OF THE INVENTION

In a first aspect of the invention, a continuous frying device for carrying out a frying process for food products is provided, comprising:
 a frying oil reservoir to be filled with a nominal volume of frying oil;
 a food product carrier which is at least partially immersible in the frying oil in the frying oil reservoir;

at least one heating unit for heating the frying oil in the frying oil reservoir during the frying process;

an oil circulation pump for circulating the frying oil from a supply side of the frying oil reservoir to an opposite distal suction end of the frying oil reservoir;

a first filter at the suction end in the frying oil reservoir for filtering particles from the circulating frying oil, wherein the oil circulation pump comprises a suction box downstream behind the first filter and is configured to, in operation, pump the frying oil from the frying oil reservoir downstream the first filter, through an external filter chain, back into the frying oil reservoir at the supply side of the frying oil reservoir, characterized in that the external filter chain comprises an oil-particle separator and a subsequent continuous non-batchwise filter system, the oil-particle separator configured to take in a flow of particle polluted oil from the frying oil reservoir and separate the flow of particle polluted oil into a first clean flow of oil, preferably containing a low amount of particles, and a second polluted flow of oil, preferably containing a relatively high amount of particles;

and wherein the external filter chain is configured so that the first clean flow of oil is fed from the oil-particle separator to the supply side of the frying oil reservoir, and the second polluted flow of oil to the continuous non-batchwise filter system that is configured to filter particles from the second polluted flow of oil onto a filter substrate while passing through a second clean flow of oil, preferably containing a low amount of particle pollution, which second clean flow of oil is fed from the continuous non-batchwise filter to the supply side of the frying oil reservoir, and wherein, preferably, the oil circulation pump, the first filter, and the external filter chain in combination are configured such that in operation a volume of at least three times the nominal volume of frying oil contained in the frying oil reservoir passes through the external filter chain per hour.

The continuous frying device for carrying out a frying process for food products has a frying oil reservoir, typically stretching a couple of meters in length. A food product carrier, such as e.g. a heat resistant endless driven belt runs from the first end where the products in operation enter the frying oil reservoir, through the volume of frying oil, towards the exit side, where the food products leave the frying oil reservoir after their thermal (frying) processing. Such food product carriers may be implemented as a single piece or as a multitude of sequential carriers adjacent to each other. As typical food products may float during the whole or a part of the frying process, in addition to a lower carrier, an optional upper guiding means, such as a heat resistant endless driven belt at a distance from the lower carrier may be mounted inside of the frying oil reservoir to keep the food products submerged in the frying oil during the thermal processing thereof.

The oil in the frying oil reservoir is in operation filled with an oil suitable for frying products that are suitable for human consumption. The frying oil is heated by a heating unit. This heating unit may be of any suitable type, but is typically an electrically heated element which is submerged in the frying oil, but more commonly in frying devices of the industrial type, the frying oil is heated by means of a heat exchange unit, such as described e.g. in Dutch patent application NL1034711A. In these types of industrial heat exchanger type heating units, a thermal oil is heated, external of the frying oil reservoir, by means of a gas burner or any other heater and circulated through pipes in the frying oil reservoir. By means of a heat exchanging contact between the frying oil and the pipes through which the heated thermal oil is circulated, the frying oil in the frying oil reservoir is heated. In heating units of the indirect heating type, it is customary to heat the heating unit using a circulating thermal fluid having an inlet temperature of approximately 260° C. The drop in temperature of the thermal fluid across the heating element is, in the loaded state, usually approximately 20° C. The starting temperature of the thermal fluid is usually approximately 240° C. Thus, the heating surface of the heating unit will usually have a temperature of more than 240° C. Usually, in an industrial-scale frying device, frying or deep-frying oils are used which have a smoke point of approximately 220° C. and a flash point of between 315° C. and 325° C. As a result of the heat exchange between the frying oil and the heating unit, the frying oil is heated to typical operating temperatures between 130° C. and 210° C. depending on the character of the thermal processing of the food product.

An oil circulation pump circulates the frying oil from a supply side of the frying oil reservoir to an opposite distal suction end of the frying oil reservoir. The direction of flow of the frying oil inside the frying oil reservoir may be in the same direction of movement as the food products, or contra directional. In order to pump the frying oil from the frying oil reservoir and through the series of filters, the pump imposes an under pressure at the suction end of the frying oil reservoir, e.g. by means of a suction box, which is in fluid connection with the oil circulation pump.

A first filter at the suction end in the frying oil reservoir filters particles from the circulating frying oil. The suction box of the oil circulation pump is mounted behind the first filter (downstream) and is configured to in operation pump the frying oil from the frying oil reservoir downstream the first filter, through an external filter chain, back into the frying oil reservoir at the supply side of the frying oil reservoir. The first filter is mounted inside the frying oil reservoir. The external filter chain is a series of filters outside (external) of the frying oil reservoir, in fluid connection with the frying oil reservoir via the oil circulation pump by means of fluid connections such as e.g. pipes or hoses. The external filter chain may be mounted to the physical frame of the frying device or implemented as a separate standalone device.

The external filter chain comprises an oil-particle separator and a subsequent continuous non-batchwise filter system. Other oil conditioning and/or filtering devices may be added in the filter chain.

The oil-particle separator is configured to take in a flow of particle polluted oil from the frying oil reservoir and separate the flow of particle polluted oil into a first clean flow of oil, preferably containing a relatively low amount of particles, and a second polluted flow of oil, preferably containing a relatively high amount of particles. The latter is also indicated as a concentrate. Such oil-particle separator may be of the centrifugal solid-fluid separator type. The separation of solids from the liquid is, in this type of separator, based on the density difference between the solids and the liquid. Due to the centrifugal action the G-force is increased, speeding up the separation process compared to gravitational separation. In this case the centrifugal force is created in what is actually a hydro cyclone. The centrifugal action comes from a whirling flow, induced by a tangential feed of the suspension in a cylindrical conical body. The cleaned oil, leaves on top while the underflow which is a relatively small part of the total flow leaves with the majority of the solids (the concentrate) at the opening underneath.

The first flow of cleaned oil is fed from the oil-particle separator to the supply side of the frying oil reservoir via a shortcut. This means that the cleaned oil from the oil-particle separator is fed towards the supply side of the frying oil reservoir. The second polluted flow of oil is fed to the continuous non-batchwise filter system configured to filter particles from the second polluted flow of oil onto a filter substrate while passing through a second clean flow of oil, preferably containing a low amount of particle pollution, which second clean flow of oil is fed to from the continuous non-batchwise filter to the supply side of the frying oil reservoir. A continuous non-batchwise filter uses a filter mechanism wherein the oil supply to be cleaned/filtered is provided continuously and in contrary to a batchwise filter, in which a batch of oil is provided to a filter and subsequently the input of oil to be filtered is stopped in order to perform a filter operation. Halting the filter operation makes the filter system more complex and results in the cooling of the frying oil during the halt of the oil input.

Whereas typical known systems decrease mesh sizes in order to catch smaller particles, thereby introducing higher flow resistance, and therefore smaller volumes of oil to pass the filter chain per unit of time, the first filter in combination with the external filter chain according to the present invention are configured such that in operation a volume of at least three times the nominal volume of frying oil contained in the frying oil reservoir passes through the external filter chain per hour. The nominal volume of oil is the amount of oil inside the frying oil reservoir when filled up to its nominal fill level. For typical industrial continuous frying systems, the nominal volume of oil is typically 2-20 $m^3$.

The term "to pass through the external filter chain" in the context of this application is defined as the amount of oil to pass the input of the oil-particle separator of the external filter chain, irrespective of its further path through the external filter chain, i.e. the volume may proceed through the complete external filter chain, or a cleaned fraction thereof may by-pass subsequent filters towards the frying oil reservoir.

Allowing more contamination particles to pass through the first filter into the external filter chain, into the oil-particle separator with a shortcut back into the frying oil reservoir for cleaned oil and to feed the concentrate of particle contaminated fraction to the continuous non-batchwise filter system, where the contaminating particles actually assist in the filter operation of that filter in order to provide cleaned oil back into the frying oil reservoir while separating and expelling the filtered out particles from the system. By this configuration of filters the filter cycle for the oil in the frying oil reservoir is performed more frequently than in known other filter systems, resulting in a higher probability of filtering particles in the frying oil.

In an embodiment according to the present invention, the first filter in combination with the external filter chain are configured such that in operation a volume of at least five times, preferably at least eight times, more preferably at least ten times the nominal volume of frying oil contained in the frying oil reservoir passes through the external filter chain per hour. The probability to filter out a contaminant particle in the frying oil increases with the number of filter cycles. Having a more open meshed first filter, letting in more contaminants into the external filter chain results in a build of a so-called filter cake on the filter substrate of the continuous non-batchwise filter system. This filter cake itself aids to the filter operation of the filter system as the filter cake itself filters additional contaminants.

In an embodiment according to the present invention, the first filter at the suction end in the frying oil reservoir comprises a wedge wire type filter. Wedge wire type filters are metallic filter media, comprising V-shaped or wedge-shaped elements that are mounted against a support structure. The oil being filtered flows through these formed slots. Most often, the surface facing the liquid is the flat/smooth side while the "v" shape is on the bottom. The support structure for this material is located opposite of the incoming material, which allows it to support the media while staying out of the path of flow. Flow direction can be either outside-to-inside or inside-to-outside and the filter is constructed accordingly. Configuring the mesh size, i.e. the distance of the opening between the consecutive wedge elements of the filter at the side of the filter along which the oil provided determines the particle sizes that are retained and allowed to pass through the filter. Due to its self-cleaning property, the risk of clogging the filter is reduced.

In a further embodiment according to the present invention, the wedge wire type filter is mounted inside the frying oil reservoir at an angle in flow direction, i.e. seen in the flow direction of the oil, the filter is mounted such that it starts at the bottom of the frying oil reservoir and angles upward towards the end of the frying oil reservoir. The oil is passed through to an oil collection chamber which is in fluid connection with the suction box of the oil circulation pump and wherein the particles filtered out of the frying oil by the first filter are in operation pushed up against the angle of the wedge wire filter by the circulating oil flow until the particles fall over an upper edge of the wedge wire filter into a particle collection box. By means of this configuration, the retained contaminants that are retained by the wedge wire filter are flushed upwards against the angled wedge wire filter by the circulation flow of the frying oil in the frying oil reservoir. When the retained contaminants reach the top of the wedge wire filter, the contaminants are pushed over the edge and are deposited in a particle collection box such that these contaminants can be disposed of. The oil and its suspended contaminants that are smaller than the mesh size of the wedge wire filter, pass through the filter into an oil collection chamber, which is separated from the particle collection box. In the oil collection chamber the oil and its suspended small contaminants are pumped out of the frying oil reservoir by the oil circulation pump towards the external filter chain.

In an embodiment according to the present invention, the mesh size of the first filter is 2-10 mm, preferably 2.5-7 mm, more preferably 3-5 mm. Whereas in common known fryer systems, the filter inside the frying oil reservoir have significantly smaller mesh sizes in order to catch and dispose of contaminants as soon as possible in the complete filter chain, the present invention has a relatively large mesh size range in order in allow relatively large contaminants into the external filter chain. This configuration of mesh size ranges allow for larger volumes of oil per time unit into the filter chain. It will be appreciated that very large particles that may prevent the normal operation of the oil circulation pump should be filtered out before the oil enters the oil circulation pump.

In an embodiment according to the present invention, the oil-particle separator is of a vertical centrifugal separator type wherein the flow of particle polluted oil is separated into a first clean flow of oil, containing a low amount of particles, exits through the top of the separator and a second polluted flow of oil (concentrate), containing a relatively high amount of particles exits the separator through the bottom of the separator. The oil-particle separator of the vertical centrifugal separator type is configured to take in a flow of particle polluted oil from the frying oil reservoir and separate the flow of particle polluted oil into a first clean flow of oil, containing a relatively low amount of particles, and a second polluted flow of oil, containing a relatively high amount of particles. The latter is also indicated as a concentrate. The separation of solids from the liquid is in this type of separators based on the density difference between the solids and the liquid. Due to the centrifugal action the G-force is increased, speeding up the separation process compared to gravitational separation. In this case the centrifugal force is created in what is actually a hydro cyclone. The centrifugal action comes from a whirling flow, induced by a tangential feed of the suspension in a cylindrical conical body. The cleaned oil, leaves on top while the underflow which is a relatively small part of the total flow leaves with the majority of the solids (the concentrate) at the opening underneath. The term "vertical" in this context is used to indicate that the gravitational separation is performed in the separator, i.e. the orientation of the separator is such that the gravitation has a high enough component on the particles in order for the separator to work.

In an embodiment according to the present invention, the continuous non-batchwise filter system comprises a continuous belt filter type filter. In the belt filter the separation is based on geometrical size. An endless belt supports a filter medium. The oil with contaminants suspended therein which is to be filtered is added on top of it and a filter cake will form.

In a further embodiment according to the present invention, the continuous belt filter type filter, comprises an endless filter belt on which a particle polluted flow of oil is pumped, wherein particles are filtered out of the flow of particle polluted oil and retained on the endless filter belt while the oil passed through the particles on the endless filter belt and through the endless filter belt. Depending on the belt filter type, fluid falls through the filter medium (and filter cake) due to gravity only, or due to an additional pressure difference created by e.g. a vacuum at the lower side of the filter medium. The filter cake will increase filter performance, by obstructing particles that are actually small enough to fall through the filter medium without the filter cake. On the other hand, the filter cake will reduce the volume flow of suspension it can handle, i.e. the capacity goes down. The belt part that has collected the thickest filter cake is moved to the belt cleaning location of the belt filter, where the filter cake is removed from the belt. Obviously whether a filter cake will be formed or not, will depend on the suspension feed. The filter medium is an endless filter belt, hence the filter medium and belt are "integrated". A typical mesh size is 50-150 μm, preferably around 70-100 μm, more preferably 80-90 μm.

In a further embodiment according to the present invention, the endless filter belt is rotated against a particle scraper such that the filtered out particles on the belt are separated from the endless filter belt. This filter belt runs, inclined, at a constant low speed submerged through a bin filled with frying oil. The oil falls through the belt based on gravity. The belt on the inclination runs out of the oil to a fixed scraper, which removes the debris from the belt, upon which the belt runs back to its starting position while the filter cake of build-up, filtered out contaminants is disposed of in a disposal chamber or box or the like.

In a further embodiment according to the present invention, wherein the endless filter belt is rotated continuously. In order to continuously dispose of the build up filter cake on the filter belt, the belt may be continuously driven. Preferably at a relatively slow belt speed in order for the filter cake to build up to a certain thickness in order to assist the filter operation while not so slow to completely clog the filter and potentially overflow the filter unit due to the continuous supply of oil to be filtered.

In another further embodiment according to the present invention, the endless filter belt is rotated at an interval. The interval can be a predetermined time interval, such as once every minute or dependent on a measurement, e.g. a measurement of the thickness of the filter cake at a certain location, the weight of the filter cake or the like. Preferably such that the filter cake can build up to a certain thickness in order to assist the filter operation while not so slow to completely clog the whole filter and potentially overflow the filter unit due to the continuous supply of oil to be filtered.

In an embodiment according to the present invention, the supply side of the frying oil reservoir comprises at least one oil supply module, wherein the oil supply module is in operation fed with a supply of filtered oil and comprises an oil supply chamber in which filtered oil is supplied at an overpressure, the oil supply chamber further comprises a nozzle plate, comprising a plurality of holes distributed over the width of the oil supply chamber though which the oil exits the oil supply chamber. The food products deposit contaminants into the oil during the frying process throughout the frying oil reservoir. In order to filter out particles from the frying oil from all locations of the frying oil reservoir it is advantageous to impose an oil flow through the frying oil reservoir which flows from the inlet side to the pump side at the distal end in such a flow pattern that the oil containing contaminants reach the pump side approximately homogenous. The nozzle plate of the oil supply chamber assists in a substantially laminar and homogenous flow from the supply side to the pump side. This results in a substantially homogenous dwell time of the frying oil in the frying oil reservoir per filter cycle.

In an embodiment according to the present invention, the oil supply module further comprises a controllable horizontally pivotable rudder, mounted downstream the nozzle plate, such that the direction of the flow of oil exiting the nozzle plate can be controlled by the pivotable rudder. By means of such a pivotable rudder, the initial stream direction of the oil from the supply chamber can be controlled, such that the flow of the oil through the reservoir and the direction of contact between the frying oil and the food products can be influenced.

In an embodiment according to the present invention, the continuous frying device further comprises at least one frying oil buffer container for storing at least a portion of the volume of frying oil outside of the frying oil reservoir. In order to perform cleaning operations on an emptied out frying oil reservoir and the frying device in general, but also in order to be able to control the mix between fresh and used frying oil, it is advantageous to have a frying oil buffer container controllably connected to the frying device. Preferably the at least one frying oil buffer container has a capacity to store all frying oil contained in the frying oil reservoir and in the filter chain and other connecting piping, such that all frying oil contained in the whole system can be stored temporarily during the frying operation and/or in order to dispose a certain amount of used frying oil after it no longer fulfils the quality requirements for frying oil.

In an embodiment according to the present invention, further comprising an oil management system, the oil management system comprises a controller for controlling valves in the continuous frying device such that the oil management system can in operation control the routing of oil through the continuous frying device, such as the flow to the supply side of the frying oil reservoir and/or the flow to an external frying oil buffer container.

The present invention also relates to a method for frying food products, wherein use is made of a continuous frying device as described herein.

Reference is made to details and advantages in the description of corresponding elements and functionality of the food processing line in the description here above. Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

BRIEF DESCRIPTION OF THE DRAWINGS

The invention will be explained in more detail with reference to the attached drawings which show a practical embodiment of the invention, but should not be regarded as being limiting, in which.

DETAILED DESCRIPTION OF EMBODIMENTS

The present invention will now be described with reference to the accompanying drawings, wherein the same reference numerals have been used to identify the same or similar elements throughout the several views.

It is noted that the drawings are schematic, not necessarily to scale and that details that are not required for understanding the present invention may have been omitted. The terms "upward", "downward", "below", "above", and the like relate to the embodiments as oriented in the drawings, unless otherwise specified. Further, elements that are at least substantially identical or that perform an at least substantially identical function are denoted by the same numeral, where helpful individualised with alphabetic suffixes.

Figure 1:
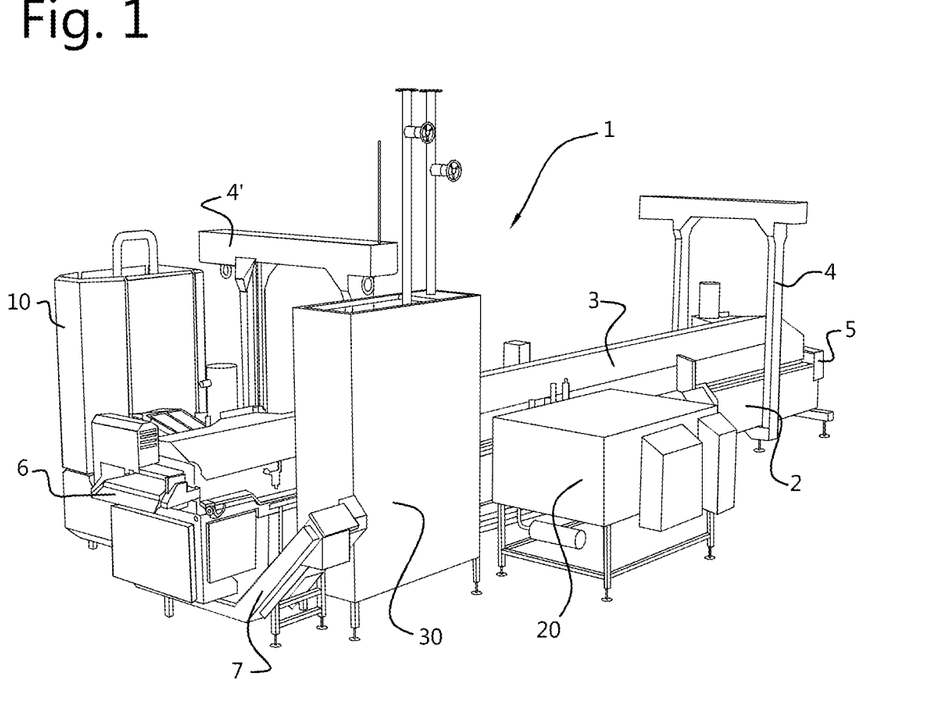
FIG. 1 shows a schematic perspective view of a continuous frying device according to the invention.

FIG. 1 shows a schematic perspective view of a continuous frying device 1 according to the invention.

The continuous frying device 1 comprises a frying oil reservoir 2 for holding a volume of frying oil and an isolated top cover 3. The top cover 3 is liftable by two spindle lift portals 4, 4' in order for the top cover 3 to be lifted e.g. for cleaning and/or service purposes. Food products to be fried are fed into the volume of frying oil in the frying oil reservoir at entrance 5 where they are gathered onto a food product carrier to be transported through at least a portion of the frying oil reservoir towards product exit 6.

In order for the oil to be filtered several filters have been supplied, including oil-particle separator 10 and continuous non-batchwise belt filter 20. One or more particle disposal units 7 have been supplied in order to dispose of the particles, such as loose crumbs, small pieces of meat or the like. Further an oil management unit 30 has been supplied comprising a plurality of controllable valves to control the route of the oil back into the oil supply side of the frying device, or e.g. to an external buffer container (not shown) for storage or disposal.

Figure 2:
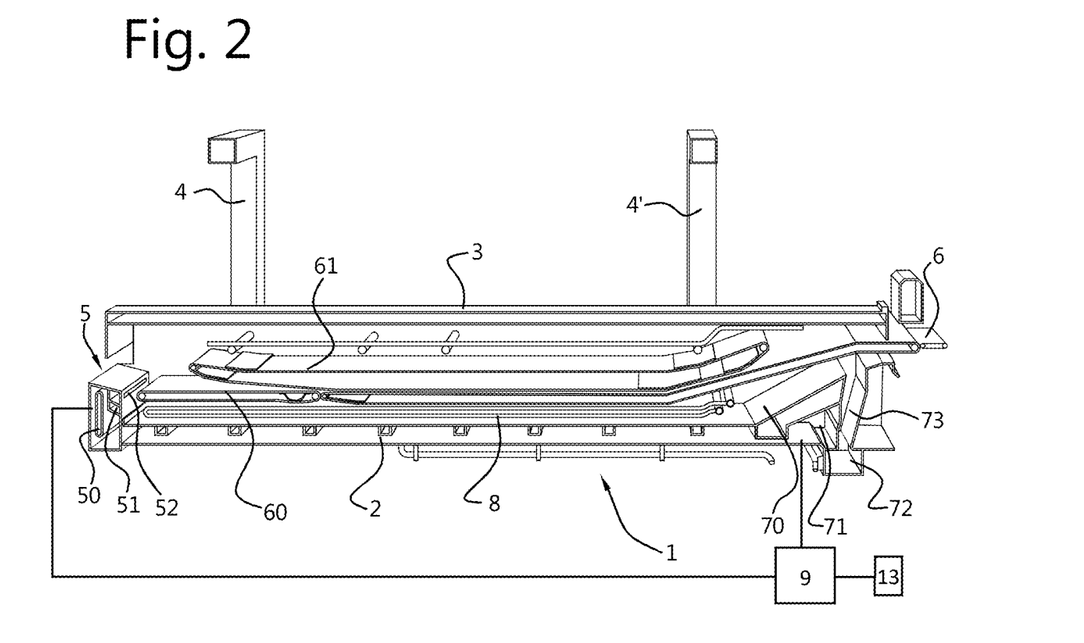
FIG. 2 shows a cross-sectional perspective view along the approximate centre line of a continuous frying device according to the invention.

FIG. 2 shows a cross-sectional perspective view along the approximate centre line of a continuous frying device 1 according to the invention.

The frying oil reservoir 2 comprises a volume of frying oil which is heated by heating unit 8. Heating unit 8 comprises a network of metal pipes through which heated thermal oil is circulated. The thermal oil exchanges its thermal energy with the frying oil in order to heat the frying oil to its operational temperature for frying the food products.

Food products enter the frying device at entrance 5 where they are gathered on driven lower conveyor belt 60 to be transported through the frying oil towards product exit 6.

Lower conveyor belt 60 consists of multiple adjacent belts 60. Over the lower conveyor belt 60 mounted at a distance there from, hold down conveyor belt 61 has been mounted to push down floating products and guide these towards the product exit 6.

The frying oil is circulated through a plurality of filters, such as wedge wire filter 70 inside the frying oil reservoir, but also to an external filter chain. The oil is subsequently supplied to oil supply module 50, wherein at least one supply pipe supplies the frying oil at an overpressure into oil supply chamber 51, after which the oil is pressed out of the oil supply chamber 51 into the frying oil reservoir 2 via nozzle plate 52. Nozzle plate 52 is releasably mounted to the oil supply chamber 51 by means of clamps or other mounting means.

By using the chamber 51 and nozzle plate 52 the flow of frying oil is substantially homogenous over the width of the reservoir 2 such that the velocity of the frying oil inside of the frying oil reservoir 2 is substantially the same for all oil over the width of the reservoir, or at least more equal than without the nozzle plate. This homogenous velocity of oil is advantageous for the overall filtering of the oil, as this results in a more homogenous transport of contaminants and other particles suspended in the oil, such that particles from all parts of the reservoir have approximately an equal chance of being filtered by one of the filters in the system.

Wedge wire filter 70 is mounted as the distal side of the reservoir relative to the oil supply module 50 and is mounted at in inclining angle in view of the circulation direction of the oil in the reservoir (i.e. in FIG. 2 from left to right). Therefore, the frying oil arrives at wedge wire filter 70 and may comprise contaminants from the frying process in the reservoir.

The frying oil passes through the wedge wire filter 70 into oil chamber 71, in which a suction box 13 of the circulation pump 9 has been mounted, which pumps the filtered oil to the external filter chain, outside of the reservoir. The contaminants and other particles which are suspended in the oil which are larger than the distance between the adjacent filter elements (wedge wires), i.e. the mesh size of the filter, are kept on top of the wedge wire filter 70 and are pushed against the inclined wedge wire filter 70 by the circulating flow of oil.

At the upper edge of the wedge wire filter 70, the filtered out particles fall over the edge into sediment container 72, which has a disposal conveyor means to convey the contaminants that are deposited into the sediment container 72, towards an external disposal trolley (not shown). Particles that are suspended in the frying oil that are smaller than the mesh size of the wedge wire filter 70 pass through the filter into the oil chamber 71 and proceed to the suction box of the circulation pump 9 towards the external filter chain.

Figure 3:
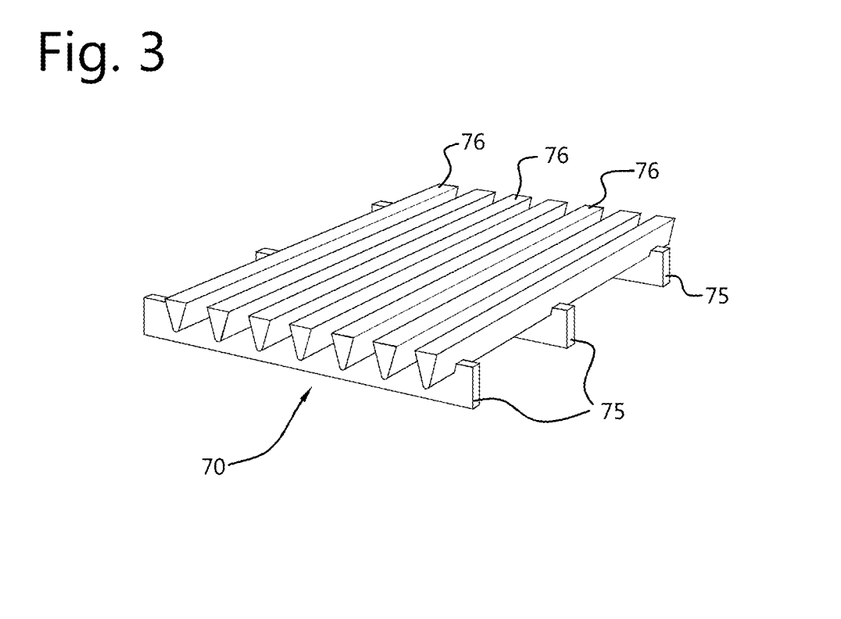
FIG. 3 shows a schematic perspective view of a wedge wire filter usable in a continuous frying device according to the invention.

FIG. 3 shows a schematic perspective view of a wedge wire filter 70 usable in a continuous frying device 1 according to the invention. The wedge wire filter 70 comprises a support structure 75 on which wedge shaped elements 76 are mounted. The wedge-shaped elements 76 are mounted on the support structure 75 with the point facing downward. The mesh size of the wedge wire filter 70 is defined as the distance between adjacent wedge wires 76, i.e. the distance between the edges of the top sides of the wedge-shaped elements 76.

Figure 4:
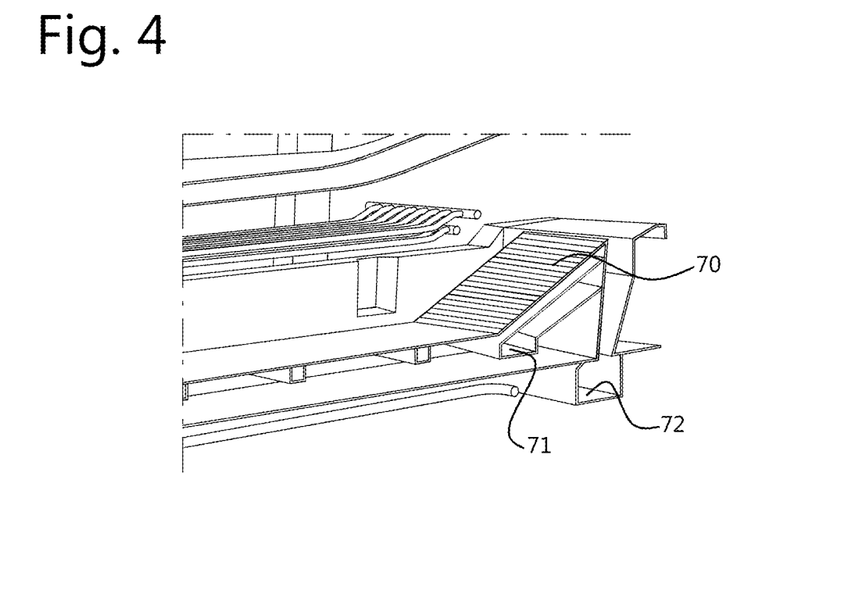
FIG. 4 shows a cross-sectional perspective view along the approximate centre line of a continuous frying device of a detail of a distal end of the frying oil reservoir according to the invention.

FIG. 4 shows a cross-sectional perspective view along the approximate centre line of a continuous frying device 1 of a detail of a distal end of the frying oil reservoir according to the invention. In this figure the isolated cover 3 of the frying device has been lifted by the lift portals 4, 4'. In this lifted state, the heater unit 8 and the transport conveyors 60, 61 are also in a lifted state as intended for maintenance and/or cleaning purposes.

Wedge wire filter 70 has been mounted at an inclination in the reservoir 2. Under the filter 70 the oil chamber 71 collects the frying oil that is passed through the filter 70 while the filtered out contaminants are fed into the sediment container 72 where they are conveyed out of the frying device 1.

Figure 5:
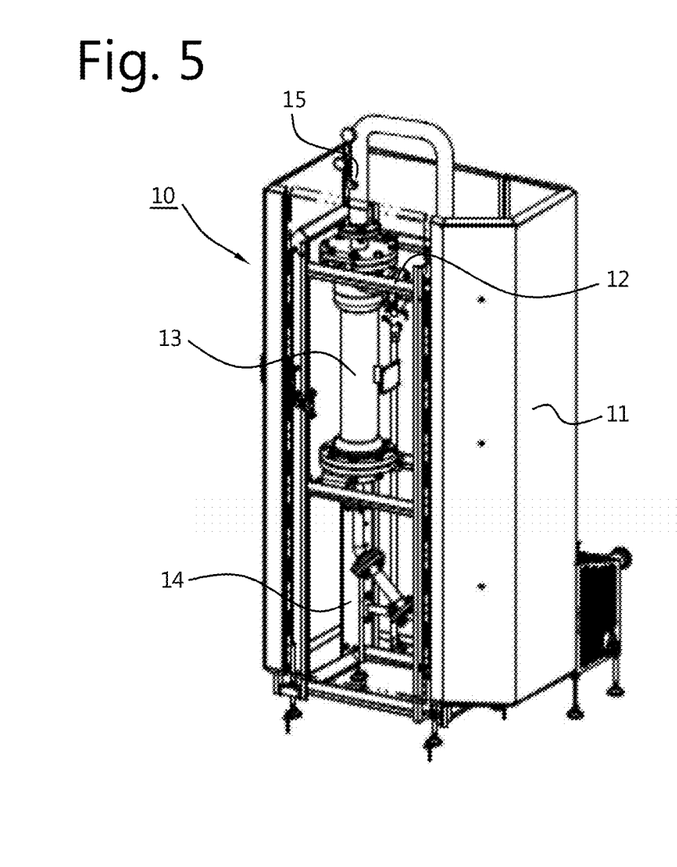
FIG. 5 shows a schematic perspective view of an oil-particle separator in the external filter chain of a continuous frying device according to the invention.
Figure 6:
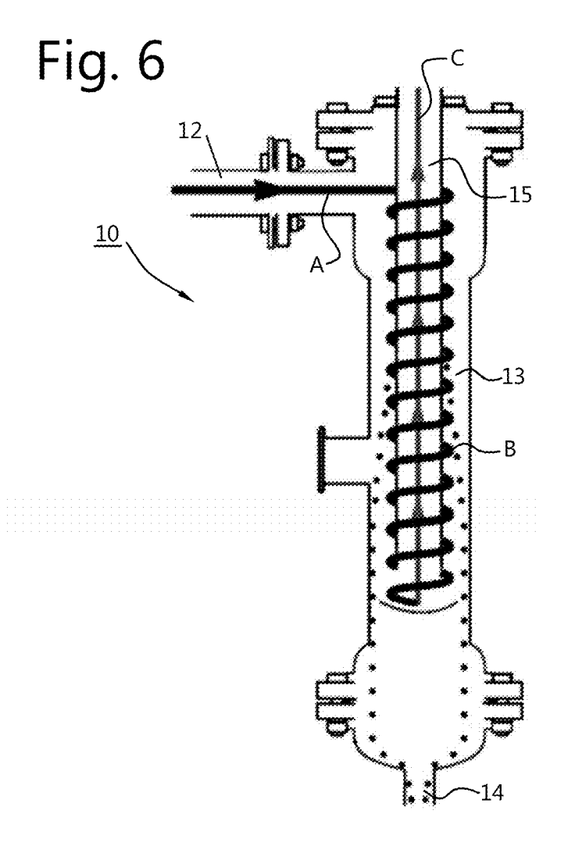
FIG. 6 shows a schematic cross-sectional view of an oil-particle separator in the external filter chain of a continuous frying device according to the invention.

FIGS. 5 and 6 show a schematic perspective view, respectively a schematic cross-sectional view of an oil-particle separator 10 in the external filter chain of a continuous frying device 1 according to the invention.

In cabinet 11 a vertically mounted oil-particle separator has been provided. The oil with contaminants, i.e. suspended particles that have passed the wedge wire filter 70, is supplied to the filter (indicated via arrow A) via horizontal supply line 12 by means of the oil circulation pump 9. The oil-particle separator uses a centrifugal separation technique. The separation of solids from the liquid is based on the density difference between the solids and the liquid. Due to the centrifugal action, the G-force is increased, speeding up the separation process compared to gravitational separation. In this case the centrifugal force is created in what is actually a hydro cyclone. An immediate advantage of such a device above a centrifuge is the absence of any moving parts. The centrifugal action comes from a whirling flow (indicated with arrow B), induced by a tangential feed of the suspension in a cylindrical-conical body. The "overflow", the cleaned liquid, leaves on top at clean oil exit 15 (indicated with arrow C) while the underflow-which is a relatively small part of the total flow-leaves with the majority of the solids at the opening underneath, at the apex.

The solid-fluid centrifugal separator is a kind of modified hydro cyclone. Its body is cylindrical without a conical part. The swirling flow is created by the tangential feed and amplified by slots of limited cross section, which drive up the tangential flow speed. The outlet at the bottom, where the flow enriched with solid particles leave, is called the purge outlet 14. The clean oil fraction that leaves the separator 10 via exit 15 is fed back to the fryer oil supply module in the reservoir. The flow enriched with solid particles proceed to the subsequent filters in the external filter chain, in this case towards the continuous belt filter 20.

Figure 7:
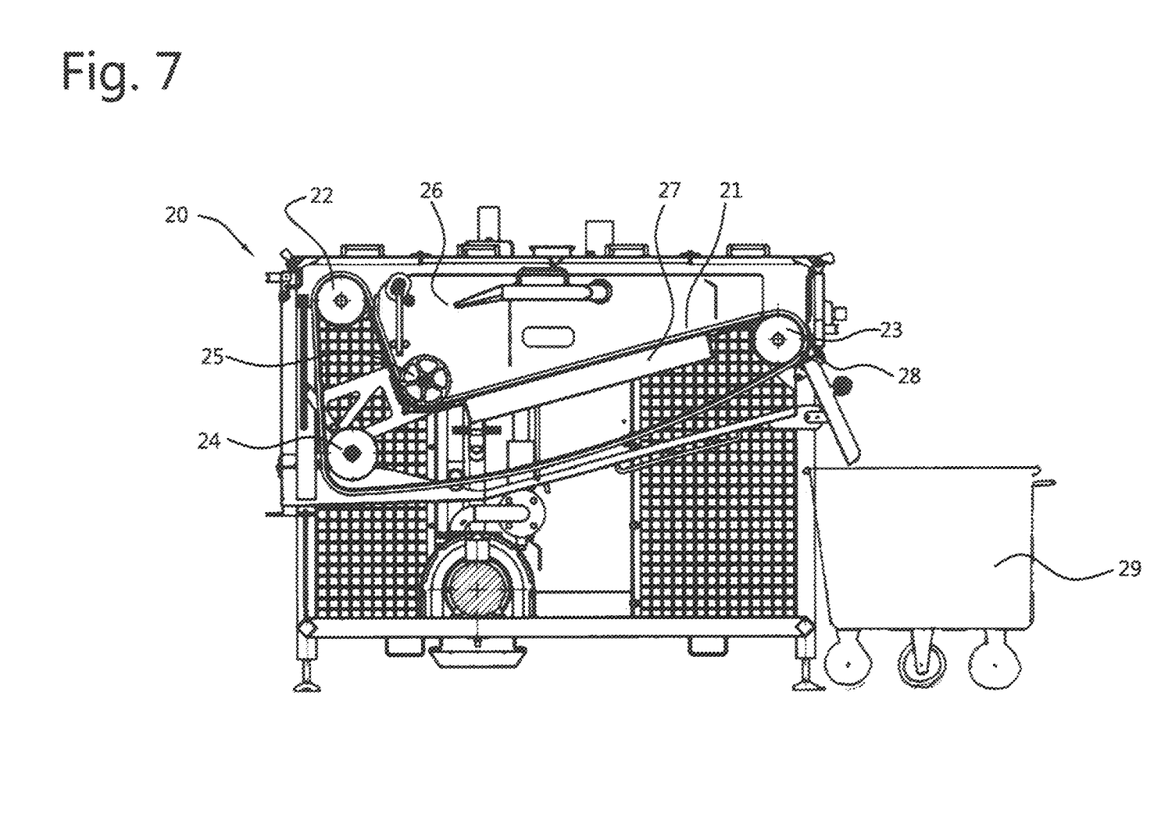
FIG. 7 shows a schematic cross-sectional view along the approximate centre line of a continuous non-batchwise filter system in the external filter chain of a continuous frying device according to the invention.

FIG. 7 shows a schematic cross-sectional view along the approximate centre line of a continuous non-batchwise filter system in the external filter chain of a continuous frying device according to the invention.

Belt filter 20 comprises a frame and cabinet in which an endless belt 21 has been mounted around rotatably mounted rollers 22, 23, 24, 25. The belt is a woven filter substrate with a small mesh size such that contaminants remain on the belt while the (filtered) oil proceeds to the collection chamber 27. The flow of frying oil with solid particles therein from the separator enter the belt filter 20 via supply mouth 26.

The oil is supplied onto the filter belt 21 on the lefthand side of FIG. 7, towards the upstanding portion of the belt. A filter cake of filtered out particles is retained on the filter belt 21. The residue of the filter cake on the belt itself acts as a filter itself, in that the filter cake also retains particles from the oil/contaminants suspension that is supplied via mouth 26. The belt is slowly rotated by one or more of the rotatably mounted rollers which is driven by an electric motor. The direction of rotation is clockwise such that the filter cake on the filter belt 21 is scraped off from the filter belt 21 by a scraper 28.

A conveniently placed disposal trolly 29 can be placed near the disposal site of the filter cake for easy disposal thereof.

Figure 8:
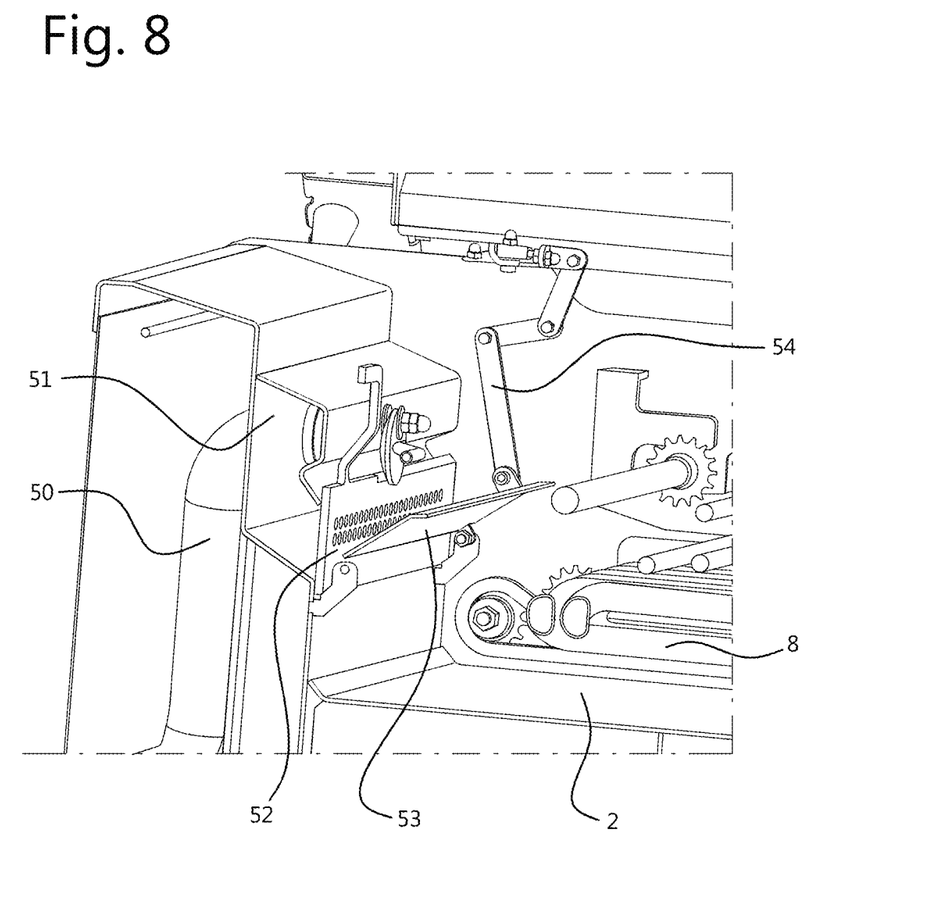
FIG. 8 shows a schematic cross-sectional perspective view along the approximate centre line of a supply side of the frying oil reservoir of a continuous frying device according to the invention.

FIG. 8 shows a schematic cross-sectional perspective view along the approximate centre line of a supply side of the frying oil reservoir 2 of a continuous frying device 1 according to the invention, in particular the oil supply module.

The frying oil is circulated through a plurality of filters such as wedge wire filter 70 inside the frying oil reservoir, and also to an external filter chain, the oil is subsequently supplied to oil supply module 50, wherein at least one supply pipe supplies the frying oil at an overpressure into oil supply chamber 51, after which the oil is pressed out of the oil supply chamber 51 into the frying oil reservoir 2 via nozzle plate 52.

Nozzle plate 52 is releasably mounted to the oil supply chamber 51 by means of clamps or other mounting means.

By using the chamber 51 and nozzle plate 52 the flow of frying oil is substantially homogenous over the width of the reservoir 2 such that the velocity of the frying oil inside of the frying oil reservoir 2 is substantially the same for all oil over the width of the reservoir, or at least more equal than without the nozzle plate. This homogenous velocity of oil is advantageous for the overall filtering of the oil, as this results in a more homogenous transport of contaminants and other particles suspended in the oil, such that particles from all parts of the reservoir have approximately an equal chance of being filtered by one of the filters in the system.

Adjacent the nozzle plate 52 a pivotable rudder 53 has been pivotably mounted. The rudder 53 is controllable via rod mechanism 54 which is controllable via a manual control lever or an automated actuator. The rudder 53 controls the direction of the oil flow after it is supplied into the frying oil reservoir 2.

Just above the oil supply module is the food product entrance 5 where food products are introduced into the frying oil and gathered onto conveyor belts 60. The rudder 53 determines whether the oil is directed mainly towards the heating unit 8 or towards the food products/conveyor belt 60.

The control of the flow direction and the homogenous flow of oil through the reservoir 2 by means of the nozzle plate 52 contribute to a more homogenous flow of the oil from the supply side towards the wedge wire filter 70 on the distal side of the reservoir. Therefore, the homogenous flow of oil contributes to a more homogenous flow of the contaminants and suspended particles in the oil flow, such that the chance of catching the contaminants in one of the filters is increased. By opening up the first filter, i.e. the mesh size of the wedge wire filter 70, more contaminants are allowed to pass through the first filter into the separator. At the separator the clean fraction is passed back to the frying oil supply module via a return connection from the separator to the frying oil reservoir, bypassing the remainder of the external filter chain. The fraction of the oil from the separator containing the solid particles that leave the bottom of the separator are fed to the continuous non-batchwise belt filter unit on which the particles that are suspended onto the filter belt, i.e. the filter cake, attribute to the filtering function of the filter as a whole. Therefore, the contra-intuitive step of letting more contaminants pass the first filter into the external filter chain, instead of filtering as many particles inside the oil reservoir as commonly done in prior art devices, contribute to a smaller flow resistance of the filter chain as a whole, resulting in more filter cycles per hour, and as a result, a higher chance on filtering out solid particles from the oil. It will be appreciated that a higher chance of taking solid particles out of the frying oil, results in a longer lifespan of the frying oil and a healthier frying process.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In particular, features presented and described in separate dependent claims may be applied in combination and any advantageous combination of such claims are herewith disclosed.

Further, the terms and phrases used herein are not intended to be limiting; but rather, to provide an understandable description of the invention. The terms "a" or "an", as used herein, are defined as one or more than one. The term plurality, as used herein, is defined as two or more than two. A plurality may also indicate a subset of two or more, out of a larger multitude of items. The term another, as used herein, is defined as at least a second or more. The terms including and/or having, as used herein, are defined as comprising (i.e., open language). The term coupled, as used herein, is defined as connected, although not necessarily directly.

Elements and aspects discussed for or in relation with a particular embodiment may be suitably combined with elements and aspects of other embodiments, unless explicitly stated otherwise. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A continuous frying device for carrying out a frying process for food products comprising:

a frying oil reservoir to be filled with a nominal volume of frying oil;

a food product carrier which is at least partially immersible in the frying oil in the frying oil reservoir;

at least one heating unit for heating the frying oil in the frying oil reservoir during the frying process;

an oil circulation pump for circulating the frying oil from a supply side of the frying oil reservoir to an opposite distal suction end of the frying oil reservoir;

a first filter at the suction end in the frying oil reservoir and arranged to filter particles from the circulating frying oil, wherein the oil circulation pump comprises a suction box downstream behind the first filter and is configured to, in operation, pump the frying oil from the frying oil reservoir downstream the first filter, through an external filter chain, back into the frying oil reservoir at the supply side of the frying oil reservoir, wherein the external filter chain comprises an oil-particle separator and a subsequent continuous non-batchwise filter system, the oil-particle separator configured to take in a flow of particle polluted oil from the frying oil reservoir and separate the flow of particle polluted oil into a first clean flow of oil and a second polluted flow of oil; and wherein the external filter chain is configured so that the first clean flow of oil is fed from the oil-particle separator to the supply side of the frying oil reservoir, and the second polluted flow of oil to the continuous non-batchwise filter system that is configured to filter particles from the second polluted flow of oil onto a filter substrate while passing through a second clean flow of oil which second clean flow of oil is fed to from the continuous non-batchwise filter to the supply side of the frying oil reservoir, and wherein the oil circulation pump, the first filter, and the external filter chain in combination are configured such that in operation a volume of at least three times the nominal volume of frying oil contained in the frying oil reservoir passes through the external filter chain per hour.

2. The continuous frying device according to claim 1, wherein a volume of at least five times the nominal volume of frying oil contained in the frying oil reservoir passes through the external filter chain per hour.

3. The continuous frying device according to claim 1, wherein the first filter at the suction end in the frying oil reservoir comprises a wedge wire type filter.

4. The continuous frying device according to claim 3, wherein the wedge wire type filter is mounted inside the frying oil reservoir at an angle in flow direction, such that the oil is passed through to an oil collection chamber which is in fluid connection with the suction box of the oil circulation pump and wherein the particles filtered out of the frying oil by the first filter are in operation pushed up against the angle of the wedge wire filter by the circulating oil flow until the particles fall over an upper edge of the wedge wire filter into a particle collection box.

5. The continuous frying device according to claim 1, wherein the mesh size of the first filter is in the range of 2-10 mm.

6. The continuous frying device according to claim 1, wherein the oil-particle separator is of a vertical centrifugal separator type wherein the flow of particle polluted oil is separated into a first clean flow of oil exits through the top of the separator and a second polluted flow of oil exits the separator through the bottom of the separator.

7. The continuous frying device according to claim 1, wherein the continuous non-batchwise filter system comprises a continuous belt filter type filter.

8. The continuous frying device according to claim 7, wherein the continuous belt filter type filter comprises an endless filter belt on which a particle polluted flow of oil is pumped,
wherein particles are filtered out of the flow of particle polluted oil and retained on the endless filter belt while the oil passed through the particles on the endless filter belt and through the endless filter belt.

9. The continuous frying device according to claim 8, wherein the endless filter belt is rotated against a particle scraper such that the filtered out particles on the belt are separated from the endless filter belt.

10. The continuous frying device according to claim 9, wherein the endless filter belt is rotated continuously.

11. The continuous frying device according to claim 9, wherein the endless filter belt is rotated at an interval.

12. The continuous frying device according to claim 1, wherein the supply side of the frying oil reservoir comprises at least one oil supply module,
wherein the oil supply module is in operation fed with a supply of filtered oil and comprises an oil supply chamber in which filtered oil is supplied at an overpressure, the oil supply chamber further comprises a nozzle plate, comprising a plurality of holes distributed over the width of the oil supply chamber though through which the oil exits the oil supply chamber.

13. The continuous frying device according to claim 12, wherein the oil supply module further comprises a controllable horizontally pivotable rudder, mounted downstream the nozzle plate, such that the direction of the flow of oil exiting the nozzle plate can be controlled by the pivotable rudder.

14. The continuous frying device according to claim 1, further comprising at least one frying oil buffer container for storing at least a portion of the volume of frying oil outside of the frying oil reservoir, further comprising an oil management system, the oil management system comprises a controller for controlling valves in the continuous frying device such that the oil management system can, in operation, control the routing of oil through the continuous frying device, such as the flow to the supply side of the frying oil reservoir and/or the flow to an external frying oil buffer container.

15. A method for frying food products with a continuous frying device including a drying oil reservoir, a food product carrier, at least one heating unit, an oil circulation pump, and a first filter, the method comprising:
filling the frying oil reservoir with a nominal amount of frying oil,
heating the frying oil in the frying oil reservoir with the at least one heating unit when frying the food products,
at least partially immersing the food products in the frying oil reservoir with the food product carrier,
circulating the frying oil from a supply side of the frying oil reservoir to an opposite distal suction end of the frying oil reservoir,
filtering particles from the circulating frying oil with the first filter at a suction end in the frying oil reservoir,
using the oil circulation pump, pumping the frying oil from the frying oil reservoir downstream the first filter, through an external filter chain, back into the frying oil reservoir at the supply side of the frying oil reservoir,
wherein the external filter chain comprises an oil-particle separator and a subsequent continuous non-batchwise filter system, the oil-particle separator configured to take in a flow of particle polluted oil from the frying oil reservoir and separate the flow of particle polluted oil into a first clean flow of oil and a second polluted flow of oil,
wherein the external filter chain is configured so that the first clean flow of oil is fed from the oil-particle separator to the supply side of the frying oil reservoir, and the second polluted flow of oil to the continuous non-batchwise filter system that is configured to filter particles from the second polluted flow of oil onto a filter substrate while passing through a second clean flow of oil which second clean flow of oil is fed to from the continuous non-batchwise filter to the supply side of the frying oil reservoir, and
wherein the oil circulation pump, the first filter, and the external filter chain in combination are configured such that in operation a volume of at least three times the nominal volume of frying oil contained in the frying oil reservoir passes through the external filter chain per hour.

* * * * *